United States Patent [19]
Thompson et al.

[11] 3,877,874

[45] Apr. 15, 1975

[54] METHOD FOR DETECTION AND DROPLET MEASUREMENT OF S-(2-DIISOPROPYLAMINOETHYL)O-ETHYL METHYLPHOSPHONOTHIOATE CHEMICAL WARFARE AGENT WITH 1,3,5 TRINITROBENZENE

[75] Inventors: Howard E. Thompson, Dugway, Utah; Frank M. Noonan, Morgantown, W. Va.

[73] Assignee: The United States of America as represented by the Secretary of the Army, Washington, D.C.

[22] Filed: Oct. 17, 1969

[21] Appl. No.: 867,423

[52] U.S. Cl. ........ 23/230 M; 23/232 R; 23/253 TP; 252/408
[51] Int. Cl. .......................................... G01n 31/22
[58] Field of Search ......... 23/230 R, 232 R, 230 M, 23/253 TP; 252/408

[56] References Cited

UNITED STATES PATENTS

| | | | |
|---|---|---|---|
| 2,919,977 | 1/1960 | Grant | 23/230 |
| 2,926,072 | 2/1960 | Kramer et al. | 23/232 |
| 3,049,411 | 8/1962 | Gelman et al. | 23/232 |
| 3,451,901 | 6/1969 | Seiger et al. | 23/232 X |
| 3,515,644 | 6/1970 | Kramer et al. | 23/232 X |

*Primary Examiner*—Benjamin R. Padgett
*Assistant Examiner*—R. E. Schafer
*Attorney, Agent, or Firm*—Robert P. Gibson; Nathan Edelberg

[57] ABSTRACT

A method for the detection and droplet measurement of an undyed chemical warfare agent comprising the impregnation of paper cards with a solution of 1,3,5-trinitrobenzene (TNB), contacting the impregnated paper cards with the agent and photographing the cards using microfilm to provide input for an Automatic Spot Counter Sizer.

3 Claims, No Drawings

METHOD FOR DETECTION AND DROPLET MEASUREMENT OF S-(2-DIISOPROPYLAMINOETHYL)O-ETHYL METHYLPHOSPHONOTHIOATE CHEMICAL WARFARE AGENT WITH 1,3,5 TRINITROBENZENE

The invention described herein may be manufactured, used, and licensed by or for the Government for governmental purposes without the payment to us of any royalty thereon. The invention relates to a method for the sampling of a chemical warfare agent and more particularly to the detection and droplet measurement of said undyed agent.

In the past, field trial estimation of warfare agents as droplets has depended upon the use of a suitable colored tracer. Usually this has consisted of an organic dye of a sufficient solubility for use in the agent. However, this technique is not applicable in situations where undyed warfare agents are involved. Surveillance testing with tactical weapons is an example.

A method was required which was capable of collecting chemical warfare agent droplets falling on a flat surface and which would leave visible stains formed by the individual droplets. A further requirement was that the stains so produced be symmetrical with uniform, smooth circumferences so that the diameters could be accurately and reliably determined. In addition, it was required that the stains exhibit sufficient contrast relative to the background of the sampler so that the stains could be readily photographed.

It is an object of this invention to provide and disclose a method for the detection of undyed chemical warfare agents.

It is a further object of this invention to provide a method for the droplet measurement of undyed chemical warfare agents.

Other objects and a fuller understanding of the invention may be ascertained from the following description and claims.

The chemical warfare agent evaluated in the present invention consisted of S-(2-diisopropylaminoethyl)O-ethyl methylphosphonothioate having the structural formula of:

$$H_3C\diagdown \overset{O}{\underset{C_2H_5O\diagup}{\overset{\diagup\!\!\!\diagup}{P}}}-SCH_2CH_2N\diagup^{CH(CH_3)_2}_{\diagdown CH(CH_3)_2}$$

The agent is produced by a transesterification process as indicated below:

$$H_3C-P\diagup^{OC_2H_5}_{\diagdown OC_2H_5} + HOCH_2CH_2N\diagup^{CH(CH_3)_2}_{\diagdown CH(CH_3)_2} \longrightarrow$$

$$C_2OH_5OH + H_3C-P\diagup^{OC_2H_5}_{\diagdown OC_2CH_2N\diagup^{CH(CH_3)_2}_{\diagdown CH(CH_3)_2}} + S \longrightarrow$$

$$H_3-\overset{OC_2H_5}{\underset{S}{\overset{|}{P}}}-OCH_2CH_2N\diagup^{CH(CH_3)_2}_{\diagdown CH(CH_3)_2} \overset{\Delta}{\longrightarrow}$$

The present invention utilizes a commercial paper stock card impregnated with 1,3,5-trinitrobenzene. Symmetrical TNB was found to have the lightest color and to give the most intensely colored product of all the polynitro compounds investigated.

Numerous solvents for the TNB were investigated including methanol, ethanol, water, benzene, acetic acid, dimethylsulfoxide, acetic anhydride and mixtures thereof. Acetic anhydride was selected as the solvent of choice due to its superior wetting action on cellulosic fibers and its high solvent power for TNB.

The paper is sensitized by soaking paper card stock, having dimensions of approximately 7 by 9 inches in a 3 percent solution of acetic anhydride solution for a period of 5 minutes. Both Printflex card stock, e.g., offset cover stock white, basis 80 lbs.; Mead Paper Co., Chicago, Ill., and Kromekote card stock, e.g., cover stock, white, basis 65 lbs., coated both sides; Champion Paper and Fiber Co., Hamilton, Ohio, were used as substrates. The cards were then dried in a forced-air electric oven at approximately 70° C for a period of 30 minutes. The dried cards were found to contain 1 percent by weight of TNB based on the dry weight of the card.

Field evaluation of the method was conducted by positioning treated Printflex cards horizontally on a grid in a dense array. The undyed chemical warfare agent was disseminated from a spray boom positioned at the center of the grid, and at a height of 24 feet above the ground. The spray boom held 10 nozzles having 0.018-inch orifices. Two pounds of agent was contained in the reservoir which was pressurized to 300 pounds per square inch.

After the dissemination of the chemical warfare agent, the stained cards were retrieved and stored for 24 hours to assure stable stain sizes. The cards were then photographed using microfilm to provide the input for an Automatic Spot Counter and Sizer (ASCAS). The ASCAS is a flying spot scanner in which the photographic images of the stains are measured and counted automatically. The image size distribution data obtained by the ASCAS was then reduced to droplet size and mass data as set forth in TAble 1 below:

Table 1

| Range of Droplet Size in Microns | Total No. of Droplets | Total Mass In Grams |
| --- | --- | --- |
| 272 | 0 | 0 |
| 247–272 | 127,900 | 1.188 |
| 221–247 | 444,940 | 3.029 |
| 196–221 | 2,071,000 | 9.977 |
| 170–196 | 7,630,100 | 24.860 |
| 145–170 | 23,305,700 | 48.483 |
| 119–145 | 20,396,000 | 86.521 |
| 93–119 | 203,337,000 | 132.429 |
| 68–93 | 475,995,000 | 141.309 |
| 68 | 130,286,000 | 17.263 |

The mass median diameter of the droplet collected on this trial was estimated to be 107 microns.

A unique characteristic of the novel sampler is the capability of producing an immediate intense dark stain when contaminated with either a dyed or undyed chemical warfare agent. In addition, the deep colored stains that developed on the treated and exposed Printflex cards, photographed well and the image produced is readily processed in the ASCAS machine.

We wish it to be understood that we do not desire to be limited to the exact method and ingredients shown and described, for obvious modifications will occur to a person skilled in the art.

Having described our invention we claim:

1. A method for the detection and droplet measurement of S-(2-diisopropylaminoethyl)O-ethyl methylphosphonothioate chemical warfare agent comprising the treatment of a paper card stock with a solution of 1,3,5-trinitriobenzene dissolved in a solvent selected from the group consisting of methanol, ethanol, water, benzene, acetic acid, dimethylsulfoxide, acetic anhydride and mixtures thereof, drying the sensitized paper, contacting the dried sensitized paper with the agent and photographing the paper card stock for evaluation.

2. A method in accordance with claim 1 wherein the paper card stock is treated with a solution comprising 3 percent by weight of 1,3,5-trinitrobenzene.

3. A method in accordance with claim 1 wherein the paper card stock is photographed using microfilm in order to provide input for an Automatic Spot Counter and Sizer.

* * * * *